May 8, 1962 D. S. STRADER 3,033,221
PRIORITY VALVE
Filed April 29, 1960

INVENTOR
DON S. STRADER
Paul O. Pippel
ATTORNEY

United States Patent Office 3,033,221
Patented May 8, 1962

3,033,221
PRIORITY VALVE
Don S. Strader, Mount Prospect, Ill., assignor to The Frank G. Hough Co., a corporation of Illinois
Filed Apr. 29, 1960, Ser. No. 25,669
6 Claims. (Cl. 137—119)

This invention relates generally to priority valves, and more specifically to a hydraulic valve which is not spring biased and which will automatically operate to divide the available fluid flow from a single source to two outlets giving one fluid outlet priority over the other relative to the available fluid flow.

The present invention is intended to be used on a machine such as a tractor loader which comprises an earth working tool operatively carried therefrom. Generally one hydraulic fluid pump is provided for operation of the tool and to aid in the steering of the vehicle. In order to provide for effective steering of the tractor it is desirable that the pressure of the hydraulic fluid delivered to the steering system be maintained substantially constant. Since the operative condition of the hydraulically operated tool will effect the fluid flow to and consequently the pressure at the steering system, it becomes necessary to provide some means for dividing the fluid flow in such a manner as to keep the hydraulic fluid pressure applied to the steering system substantially constant.

It is the object of the present invention to provide a priority valve which will deliver the substantially entire flow of the single pump to the tool circuit when flow to a steering circuit is not required and to act automatically to provide a divided flow when a pressure signal from the steering circuit indicates demand for a controlled flow to the steering circuit.

It is another object of the present invention to provide a priority valve which will function to automatically divide the available output from a single hydraulic pump between a tool system and a steering system with the hydraulic fluid pressure to the steering system being maintained substantially constant under all operative conditions of the tool system.

It is a further object of the present invention to provide a priority flow divider valve which is simple in construction and is not biased by any coiled springs and which will automatically operate to divide the available hydraulic fluid flow from a single pump to two outlets with the outlet achieving priority over the other in the available fluid from the pump.

Figure 1:
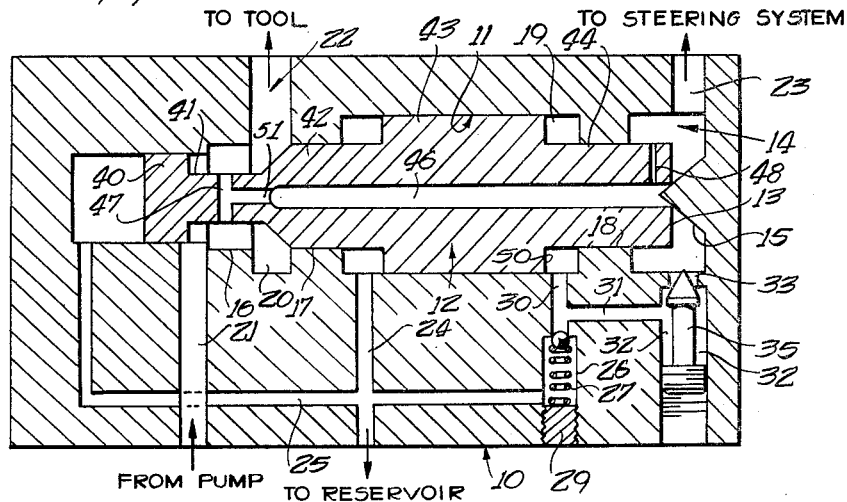
Figure 2:
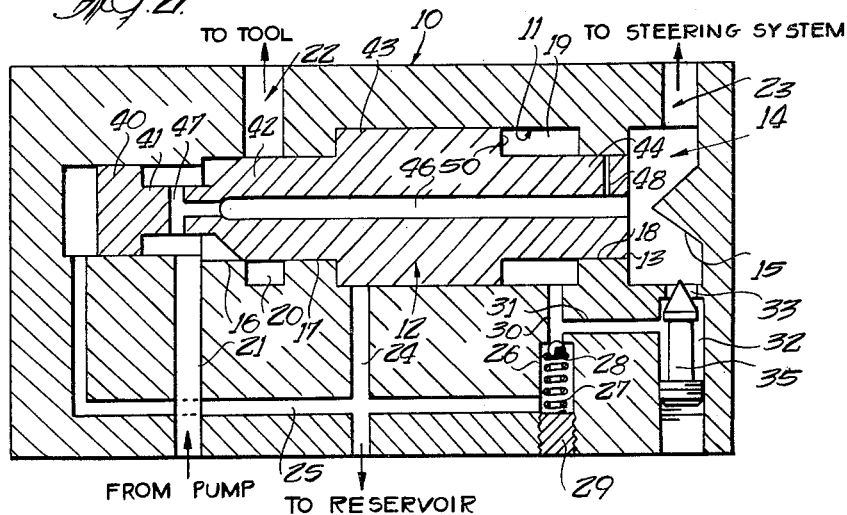

Other objects and features of the present invention will be apparent upon a perusal of the following specification and drawing of which:

FIGURE 1 is a somewhat diagrammatic cross sectional view of a valve constructed according to the present invention and showing the valve spool in one extreme operated position, and FIGURE 2 is a view similar to FIGURE 1 except that the spool is shown in the other extreme operated position.

The present embodiment is the preferred embodiment but it is to be understood that changes can be made in the present embodiment by one skilled in the art without departing from the spirit or scope of the present invention.

For a general description of the present invention reference is made to the drawing.

A valve housing is provided with a valve bore formed therein and having a number of annular grooves positioned along the longitudinal axis of the valve bore. A cylindrical valve spool having a number of lands and annular grooves is freely slidably carried in the valve bore and cooperates with the annular grooves of the valve bore to perform the necessary functions of the valve. The hydraulic flow is directed through the valve body into the valve bore adjacent one end thereof. Two outlets are also formed through the valve body into the valve bore, one outlet for the tool means which is connected into the valve bore adjacent the pump connection and one outlet for the steering system which is connected into the valve bore at the other end thereof. The valve spool is provided with a passageway extending substantially longitudinally therethrough. The passageway is provided with an orifice which reduces the available volume of fluid to the steering system since a steering system generally requires much less fluid than a tool system. The portion of the valve spool exposed to the tool flow is smaller in effective area than the effective area which is in fluid connection by certain means to the outlet for the steering system to counteract the effect of the pressure drop across the orifice in the passageway. When no steering pressure is required at the steering system outlet, the fluid pressure from the pump will move the valve spool to the position shown in FIGURE 1, permitting substantially the full output of the pump to be delivered through the valve bore to the tool system outlet. When hydraulic fluid pressure is required at the steering system outlet in addition to that being supplied to the tool system outlet, back pressure from the steering system outlet will be applied over a larger area of the valve spool than is applied at the other end portion thereof, and the valve spool will be moved to the position shown in FIGURE 2 cutting off the hydraulic fluid flow to the tool system outlet and providing for pressure at the steering system outlet. The pressure at the steering system end of the valve spool is to a certain extent controlled by a valve in communication with the steering system end of the valve spool, since that valve will vent fluid therefrom above a predetermined pressure. As the hydraulic fluid requirements of the steering outlet vary, the valve spool will be automatically moved by the fluid pressures at each end thereof to provide for the necessary distribution of the available hydraulic fluid flow, while under all conditions giving priority of hydraulic fluid to the steering system outlet. As can be seen in the drawings, no coiled springs are used on the valve spool to bias it to any position, the valve spool being freely slidable through its range of movement.

For a detailed description of the present invention continued reference is made to the drawing. The valve housing 10 is provided with a valve bore 11 which is closed at each end. The valve spool 12 is freely slidably positioned in the valve bore 11. The end 13 of the valve spool 12 and the adjacent closed end of the valve bore 11 define a chamber 14. The end wall of the valve bore 11 in chamber 14 is provided with a cone shaped projection 15 which is in alignment with the axis of the valve spool 12. The valve bore 11 is provided with three annular lands 16, 17 and 18. Land 18 partially defines one wall of chamber 14, and lands 17 and 18 are separated by annular groove 19. Lands 16 and 17 are separated by annular groove 20, and the portion of the valve bore 11 from land 16 to the end of the bore 11 has a diameter smaller than the diameter of the land 16.

A hydraulic fluid pump pressure port is provided and is connected by passageway 21 into the valve bore 11 on the side of land 16 opposite from groove 20. A tool system port is also provided and is connected into annular groove 20 by passageway 22. A steering system port is connected into chamber 14 at the end of valve bore 11 by passageway 23. A drain port for connection to the reservoir or exhaust line of the system is connected into annular groove 19 by passageway 24. Passageway 24 is intersected by passageway 25. One end of passageway 25 is connected into the valve bore susbtantially at the end adjacent land 16, and the other end thereof is connected into chamber 26. Chamber 26 is provided with a check valve comprising the coiled spring 27 and the ball 28. An adjusting screw 29 is provided for varying the pressure setting of the check valve. The ball 28 of the check valve is seated in one end of passageway 30, the other end of which is connected into annular groove 19 at the end thereof defined by land 18. Passageway 30 is intersected by one end of passageway 31, the other end of which is connected into chamber 32. Chamber 32 is connected into chamber 14 through the opening 33. A cone shaped valve spool 35 having a threaded end portion is disposed in the chamber 32 and into the opening 33 so that by threading the spool 35 to a position such as shown in the drawing, an orifice is created to provide a damping action in the operation of the valve.

The valve spool 12 comprises five sections 40, 41, 42, 43 and 44. The section 40 is of a diameter larger than the diameter of the section 41 but smaller than the diameter of the section 42. Section 42 is of the same diameter as section 44 and of a smaller diameter than section 43. Valve spool 12 further comprises a passageway 46 which extends from the end 13 of the valve spool 12 along the axis of the valve spool 12 to a T-shaped passageway 47, which opens at each end thereof on the surface of section 41 of the valve spool 12. Passageway 47 is of a smaller diameter than passageway 46 thereby creating the orifice 51 which reduces the volume of fluid available to and through passageway 46. A smaller orifice or passageway 48 is also provided in the valve spool 12 and extends between passageway 46 and the surface of section 44 of the valve spool 12. The diameter of the orifice 48 is substantially smaller than the diameter of passageway 47 so that fluid pressure can be maintained in passageways 47 and 46.

The various sections of the valve spool 12 are so arranged relative to the valve housing 10 and the valve bore 11 that when the valve spool 12 is in its innermost position of chamber 14, the end of passageway 46 is closed by the end of the projection 15, the orifice 48 is in fluid communication with chamber 14, the section 43 is substantially centered in the annular groove 19 of the valve bore 11 so that passageway 30 is in free fluid communication with the end wall 50 of section 43 in annular groove 19, passageway 24 is in free fluid communication with the annular groove 19 at the other end of the section 43 of valve spool 12, and passageway 21 is in free fluid communication with passageway 22 about section 41 of the valve spool 12 and through the groove 20. In the other extreme operated position of the valve spool 12, that shown in FIGURE 2, it may be seen that the orifice 48 is blocked by land 18, passageway 24 is blocked by section 43 of the valve spool 12, and passageway 22 and annular groove 20 are blocked from communication with passageway 21 by the section 42 of the valve spool 12.

Turning next to a description of the operation of the present invention in order that its construction may be readily understood, continued reference is made to the drawing. Assuming first that the steering system requires no hydraulic fluid under pressure and that the tool system requires the available fluid from the pump, the hydraulic fluid under pressure entering passageway 21 from the pump will flow into the valve bore 11 past the land 16, to annular groove 20 and passageway 22 to the tool system. Since the effective area of the end wall of the section 42 of the valve spool 12 is larger than the effective area of the end wall of the section 40, the hydraulic fluid pressure will maintain the valve spool in the position shown in FIGure 1. In this position substantially no hydraulic fluid is delivered to the steering system since the projection 15 blocks the end of the passageway 46. A small metered flow of the hydraulic fluid will be delivered to chamber 14 through the orifice 48. This fluid passes from the section 41 of the valve spool 12 through passageway 47, and passageway 46 to the orifice 48. The pilot flow of the orifice 48 prevents the valve from being hydraulically locked since the steering system when not requiring pressure is vented and since the back pressure created by operation of the steering system is used to move the valve to the position shown in FIGURE 2 or an intermediate position therefrom. The passageways 24 and 25 communicating with the valve bore as shown in FIGURE 1 provide for drainage of fluid leakage from those portions of the valve.

Assuming next that the tool system requires no hydraulic fluid under pressure, and that the hydraulic steering system requires substantially the entire hydraulic fluid output of the pump, the operation of the steering system will cause the hydraulic fluid pressure applied to the orifice 48 to be applied to the end 13 of the spool 12, and through the opening 13, chamber 32, passageway 31, and passageway 30 into the chamber defined by the end wall 50 of section 43 of the spool 12 and the annular groove 19 of the valve bore 11. The effective area of the valve spool 12 against which the hydraulic fluid is applied to tend to unseat the valve spool 12 from the projection 15 is substantially larger than the effective area of the spool 12 for seating the valve spool 12 against the projection 15, and as a result thereof the valve spool 12 will be moved to the position shown in FIGURE 2. The annular groove 20 and passageway 22 are then blocked from fluid communication with passageway 21, and the available hydraulic fluid under pressure will flow from passageway 21, into the valve bore 11, passageway 47, passageway 46, chamber 14 and through passageway 23 to the steering system. The relief valve in chamber 26 is provided so that in this operated position of the valve, a limit is provided for the volume which may be supplied to the steering system. The valve will remain closed to permit pressure to be applied to wall 50 of the valve spool 12 counteracting the pressure drop across orifice 51 to keep the spool away from projection 15 until the volume of fluid necessary to the steering system is satisfied. When steering flow has been satisfied the ball 28 will be unseated to permit fluid flow from chamber 14, chamber 32, passageways 31 and 30 and passageway 25 to the reservoir.

Assuming next that the steering system is operated, but does not require the maximum in the available hydraulic fluid pressure, and that the tool system is also operated, the lower back pressure produced by the steering system or the lower pressure in the chamber 14 and groove 19 will, relative to the pressure about section 41 of spool 12, permit the valve spool 12 to be moved to a position somewhere between the position of FIGURES 1 and 2. In this position the section 42 of the valve spool 12 will unblock annular groove 20 from land 16, and hydraulic fluid under pressure will then also be delivered to the tool system. No matter how much hydraulic fluid under pressure is required by the tool system, the fluid pressure acting upon the end wall of the section 42 of valve spool 12 is never sufficient to move the valve spool 12 to the position shown in FIGURE 1 as long as the steering system is operated because of the larger effective area of the valve spool 12 at end 13 and wall 50. The steering system will take priority over the tool system and at any time that the steering system requires additional hydraulic fluid under pressure, the valve spool 12 will be moved toward the position shown in FIGURE 2 to the extent necessary to satisfy the volume requirements of the steering system and limited by the setting of the valve in chamber 26.

Having described the invention what is considered new and desired to be protected by Letters Patent is:

1. In a hydraulic system having a source of hydraulic fluid under pressure, a valve connected to said source and operable to automatically deliver the available hydraulic fluid from said source to two outlets with one of said outlets in which a back pressure may be established having priority over the other of said outlets for the available hydraulic fluid under pressure, said valve comprising a valve bore and a valve spool positioned in said valve bore and freely slidable therein in two directions, said one of said outlets connected into said bore at one end thereof, the other of said outlets connected into said valve bore at a position longitudinally spaced from said one end, said valve spool being formed with an annular reduced system adjacent one end thereof and positioned so that said one outlet is substantially blocked and said source of hydraulic fluid is connected through said annular reduced section to said other outlet when said other end of said spool engages said one end of said bore, a passageway formed through said valve spool from said reduced section to said other end thereof so that said other outlet is substantially blocked and said source of hydraulic fluid is connected through said passageway to said one outlet when said spool is moved away from said one end of said valve bore to the extreme position in the other direction, said valve spool and said valve bore further being formed with an enlarged central portion and a second fluid passageway connected between said one end of said valve bore and the side of said enlarged central portion toward said one end of said valve bore so that the effective area of said valve spool communicating with said one outlet is substantially greater than the effective area of said valve spool communicating with said other outlet, relief valve means connected into said valve bore at said one end thereof for venting fluid from said one end of said valve bore above a predetermined pressure, and an orifice connected between said valve spool passageway and said other end of said valve spool for bleeding fluid between said one end of said valve bore and said valve spool passageway.

2. In a hydraulic system having a source of hydraulic fluid under pressure, a valve connected to said source and operable to automatically deliver the available hydraulic fluid from said source to two outlets with one of said outlets in which a back pressure may be established having priority over the other said outlets for and requiring substantially less volume of the available hydraulic fluid under pressure, said valve comprising a valve bore and a valve spool positioned in said valve bore and freely slidable therein in two directions, said one of said outlets connected into said bore at one end thereof, the other of said outlets connected into said valve bore at a position longitudinally spaced from said one end, said valve spool having a passageway formed longitudinally therethrough from the end of said spool communicating with said one outlet to a position on the surface thereof which is in fluid communication with said source of hydraulic fluid, an orifice formed in said passageway for reducing the volume of fluid to said one outlet, said valve bore being closed at said one end thereof and said valve spool being formed with an annular reduced section at said position which is in fluid communication with said source of hydraulic fluid so that said passageway is substantially blocked by said one end of said valve bore and said other outlet is in free fluid communication with said source of hydraulic fluid through said reduced section when said valve spool is positioned against said closed one end of said valve bore, and so that said other outlet is substantially blocked and said passageway is in free fluid communication with said one outlet and said source of hydraulic fluid when said spool is moved away from said one end of said valve bore to the extreme position in the other direction, said valve spool and said valve bore further being relatively formed with an enlarged central portion and a second fluid passageway connected between said one end of said valve bore and the side of said enlarged central portion toward said one end of said valve bore so that the effective area of said valve spool communicating with said one outlet is substantially greater than the effective area of said valve spool communicating with said other outlet to counteract any pressure drop across said orifice and permit said one outlet to achieve priority over said other outlet, a relatively small passageway provided in said valve spool between said axial passageway and the outer surface of the end portion thereof in communication with said one outlet to prevent said valve spool from being hydraulically locked against said one end of said valve bore, and an adjustable relief valve for venting fluid above a predetermined pressure from said second passageway.

3. In a hydraulic system as claimed in claim 2 wherein said one end of said valve bore is provided with a cone shaped projection the axis of which coincides with the axis of said passageway whereby said passageway is gradually blocked by said cone shaped projection when said valve spool is moved toward said one end of said valve bore.

4. In a hydraulic system having a source of hydraulic fluid under pressure, a valve connected to said source and operable to automatically deliver the available hydraulic fluid from said source to two outlets with one of said outlets in which a back pressure may be establised having priority over the other said outlets for and requiring substantially less volume of the available hydraulic fluid under pressure, said valve comprising a valve bore and a valve spool positioned in said valve bore and freely slidable therein in two directions, said one of said outlets connected into said bore at one end thereof, the other of said outlets connected into said valve bore at a position spaced longitudinally from said one end, said valve spool being formed to have an intermediate portion of a larger diameter than said end portions, and a pair of annular lands formed in said valve bore on each side of said intermediate portion of said valve spool and having a diameter substantially equal to the diameters of said end portions of said valve spool, said intermediate portion of said valve spool having a length less than the distance between said annular lands, a passageway formed through said valve spool along the longitudinal axis thereof and extending from one end of said valve spool to the surface of said valve spool substantially at the other end portion thereof, an orifice formed in said passageway, said valve spool being formed with an annular reduced section at said other end portion of said valve spool and including one end of said passageway and said valve bore being closed at said one end thereof so that the end of said passageway terminating at said one end of said valve spool is blocked from fluid communication with said one outlet and said source of hydraulic fluid is connected to said other outlet through said reduced section when said one end of said valve spool engages said one end of said bore, and so that said other outlet is blocked by said other end portion of said valve spool from fluid communication with said source of hydraulic fluid and the end of said passageway terminating in said reduced section at said other end portion of said valve spool is in fluid communication with said source of hydraulic fluid and said passageway is in free fluid communication with said one outlet when said valve spool is moved away from said one end of said valve bore to the extreme position in the other direction, and a second fluid passageway formed in said valve body and connected between said one outlet and said valve bore between said intermediate portion of said valve spool and the land of said pair of lands which is adjacent to said one end of said valve bore so that any fluid pressure at said one outlet is applied to the intermediate portion of said valve spool to counteract any pressure drop across said orifice to permit said one outlet to achieve priority over said other outlet for the available hydraulic fluid, a relatively small passageway connected between said longitudinal passageway of said valve spool and said one end portion of said valve spool to prevent said valve spool from being hydraulically locked against said one end of said valve bore, and an adjustable relief for venting fluid above a certain predetermined pressure from said second passageway.

5. In a hydraulic system as claimed in claim 4 wherein said one end of said valve bore is formed to have a cone shaped projection on said closed end thereof positioned along the axis of said longitudinal passageway of said valve spool so that said passageway is gradually blocked by said projection when said valve spool is moved toward said one end of said valve bore.

6. In a hydraulic system as claimed in claim 4 wherein said second passageway is provided with an adjustable member for changing the effective diameter of said second passageway.

References Cited in the file of this patent

UNITED STATES PATENTS

| | | |
|---|---|---|
| Re. 24,892 | Banker | Oct. 25, 1960 |
| 2,737,196 | Eames | Mar. 6, 1956 |